(12) United States Patent
Pehle et al.

(10) Patent No.: US 10,323,707 B2
(45) Date of Patent: Jun. 18, 2019

(54) VEHICLE DISK BRAKE

(71) Applicant: BPW Bergische Achsen KG, Wiehl (DE)

(72) Inventors: Michael Pehle, Leverkusen (DE); Günter Dowe, Nümbrecht (DE); Andreas Dowe, Nümbrecht (DE)

(73) Assignee: BPW Bergische Achsen KG, Wiehl (DE)

( * ) Notice: Subject to any disclaimer, the term of this patent is extended or adjusted under 35 U.S.C. 154(b) by 0 days.

(21) Appl. No.: 15/115,919

(22) PCT Filed: Feb. 2, 2015

(86) PCT No.: PCT/DE2015/100043
§ 371 (c)(1),
(2) Date: Aug. 2, 2016

(87) PCT Pub. No.: WO2015/117601
PCT Pub. Date: Aug. 13, 2015

(65) Prior Publication Data
US 2017/0175837 A1 Jun. 22, 2017

(30) Foreign Application Priority Data
Feb. 4, 2014 (DE) .......... 10 2014 101 341

(51) Int. Cl.
*F16D 65/56* (2006.01)
*F16D 65/18* (2006.01)
(Continued)

(52) U.S. Cl.
CPC ........... *F16D 65/567* (2013.01); *F16D 65/14* (2013.01); *F16D 65/18* (2013.01); *F16D 65/54* (2013.01);
(Continued)

(58) Field of Classification Search
CPC ........ F16D 65/18; F16D 65/54; F16D 65/567; F16D 2121/14; F16D 2125/40; F16D 2125/582; F16D 2125/64
See application file for complete search history.

(56) References Cited

U.S. PATENT DOCUMENTS

| 4,718,522 A | | 1/1988 | Frania et al. |
| 4,830,149 A | * | 5/1989 | Giering ................. F16D 65/567 188/196 V |
| 5,788,022 A | | 8/1998 | Antony |
| 6,059,086 A | * | 5/2000 | Studer .................... H02K 7/108 192/56.2 |

(Continued)

FOREIGN PATENT DOCUMENTS

| DE | 102 60 597 | 7/2004 |
| DE | 10 2011 051 073 | 12/2012 |

(Continued)

*Primary Examiner* — Melody M Burch
(74) *Attorney, Agent, or Firm* — Gudrun E. Huckett

(57) ABSTRACT

A vehicle disk brake has a brake-application device providing a braking force and has a force element and a pressure-boosting lever arrangement. A readjustment device for compensatory readjustment of the wear-induced air clearance of the brake is provided that has a rotatably arranged drive element to be actuated by the brake-application device, a readjustment element arranged rotatably on the same axis, and a transmission device arranged in the movement path between drive element and readjustment element. To provide a readjustment device of a structurally simple design with a small number of parts, the transmission device is in the form of a helical wrap spring which is radially supported at the inner side along a first helix section relative to the drive element and is radially supported at the outer side along a second helix section relative to the readjustment element.

10 Claims, 4 Drawing Sheets

(51) Int. Cl.
  *F16D 65/14*    (2006.01)
  *F16D 65/54*    (2006.01)
  *F16D 121/14*   (2012.01)
  *F16D 125/26*   (2012.01)
  *F16D 125/28*   (2012.01)
  *F16D 125/32*   (2012.01)
  *F16D 125/40*   (2012.01)
  *F16D 125/58*   (2012.01)
  *F16D 125/64*   (2012.01)

(52) U.S. Cl.
  CPC ...... *F16D 2121/14* (2013.01); *F16D 2125/26* (2013.01); *F16D 2125/28* (2013.01); *F16D 2125/32* (2013.01); *F16D 2125/40* (2013.01); *F16D 2125/582* (2013.01); *F16D 2125/64* (2013.01); *F16D 2250/0084* (2013.01)

(56) References Cited

U.S. PATENT DOCUMENTS

| | | | |
|---|---|---|---|
| 2003/0079948 A1* | 5/2003 | Jolly | F16D 57/002 188/267 |
| 2006/0163011 A1* | 7/2006 | Sandberg | F16D 65/567 188/73.1 |
| 2006/0180411 A1* | 8/2006 | Banks | F16D 7/021 188/72.9 |

FOREIGN PATENT DOCUMENTS

| | | |
|---|---|---|
| EP | 0 216 008 | 4/1987 |
| EP | 0 730 107 | 9/1996 |
| EP | 1 972 825 | 9/2008 |
| EP | 2 476 929 | 7/2012 |
| WO | 97/22814 | 6/1997 |
| WO | 2004/059187 | 7/2004 |

* cited by examiner

VEHICLE DISK BRAKE

BACKGROUND OF THE INVENTION

The invention relates to a vehicle brake, in particular a vehicle disk brake, having a brake-application device, which provides the braking force and which comprises a force element, preferably a pressure medium cylinder, and a pressure-intensifying lever arrangement, and having a readjustment device for readjustment of the wear-induced release clearance of the brake, wherein component parts of the readjustment device are a rotatably arranged drive element, which can be actuated by the brake-application device, a readjustment element arranged rotatably on the same axis, and a transmission device arranged in the movement path between the drive element and the readjustment element.

Vehicle disk brakes are often provided with a readjustment device to compensate brake-lining and/or brake-disk wear. This successively adapts the clearance between the brake pads and the brake disk in accordance with increasing wear and thus maintains this "release clearance" within a range predetermined by the design.

A readjustment device integrated into a disk brake is known from DE 10 2011 051 073 A1. Readjustment is accomplished by means of two threaded elements, which can be screwed relative to one another. The screwed joint has an axial backlash and hence an idle path, the size of which determines the readjustment. Further elements of the readjustment device are an overload clutch, which operates in a torque-dependent manner, and a one-way clutch. The one-way clutch operates with cylindrical locking elements arranged in such a way as to be movable in a circumferential direction. These can run up onto ramps in one direction of rotation, thereby leading to locking in this direction of rotation and hence full torque transmission. In the opposite direction, the locking elements run freely, and therefore there is only slight torque transmission in this direction of rotation. The overload clutch is arranged in a manner spatially separated from the one-way clutch and comprises balls, which are seated under pressure in slotted depressions in an axial end face of the readjustment element. Under an increased resistance torque, the balls leave the depressions.

For implementing the one-way clutch of the readjustment device, wrap springs are known from WO 97/22814, EP 0 216 008 B1, EP 0 730 107 B1 and DE 102 60 597 B4. These are cylindrical, coiled spring elements which are mounted under radial prestress on the cylindrical outer surfaces of two shafts or the cylindrical inner surfaces of two sleeves. In one direction of rotation, there is full, slip-free torque transmission through the frictional engagement of the wrap spring, whereas, in the opposite direction of rotation, there is only slight torque transmission.

It is the underlying object of the invention to create a vehicle brake provided with a readjustment device for readjustment of the wear-induced release clearance, in which the readjustment means is of structurally simple design and requires only a small number of parts.

SUMMARY OF THE INVENTION

To achieve this object, a vehicle brake is proposed that is characterized in that the transmission device is designed as a helical wrap spring, which, along a first coil section, is supported radially with respect to the drive element and, along a second coil section, is supported radially with respect to the readjustment element, wherein one radial support is on the inside and the other radial support is on the outside of the wrap spring.

In order, in this vehicle brake, to impart successive movements in the same direction to the readjustment element to compensate the wear-induced release clearance of the brake, the helical wrap spring serving as a transmission device is designed in such a way that, along a first coil section, it is supported radially exclusively with respect to the drive element and, along a second coil section, it is supported radially exclusively with respect to the readjustment element, wherein one radial support is on the inside and the other radial support is on the outside of the wrap spring.

A wrap spring of this kind combines the two basic types of construction of wrap spring known in the prior art, namely the wrap spring supported from the outside against two shafts and the wrap spring supported from the inside against two sleeves. The combination of the two principles is performed in such a way that, in one coil section of the wrap spring, radial support is provided only on the inside thereof and, in another coil section of the wrap spring, radial support is provided only on the outside thereof. This has the result that there is full torque transmission over one coil section by virtue of powerful, as it were "gripping" frictional engagement whereas, over the other coil section, only a torque of limited magnitude can be transmitted, which can also be referred to as a freewheeling torque. This only slight torque corresponds to the release torque in overload clutches of the kind known from readjustment devices.

The wrap spring therefore combines and unites the function of the one-way clutch with the function of the overload clutch. In contrast to known readjustment devices for vehicle brakes, separate components for implementing the one-way clutch, on the one hand, and the overload clutch, on the other hand, are not required, and therefore the readjustment device requires only a small number of components and is of structurally simple design.

With one embodiment, the proposal is that each of the two coil sections of the wrap spring extends over a plurality of coils or coil turns. In this case, the number of coil turns in the two coil sections can be equal or different. Each of the two coil sections preferably extends over at least three coil turns.

The wrap spring can be cylindrical with a constant diameter over its entire length in the unstressed state.

For optimum utilization of the installation space available in the readjustment device, the wrap spring can be of stepped configuration in the unstressed state and can be composed of in each case two cylindrical longitudinal sections. In this arrangement, the spring windings in the first longitudinal section have a smaller diameter and have the radial support on their inside, whereas the spring windings in the second longitudinal section have a comparatively larger diameter and have the radial support on their outside.

With another embodiment, the proposal is that a pivoted lever, which is mounted in a brake housing of the brake and is in rotary connection with the drive element via a mechanism, is a component part of the lever arrangement. In this design, the mechanism preferably consists of two followers designed for mutual engagement, wherein one follower is arranged on the pivoted lever at a distance from the pivoting axis thereof, and the other follower is arranged on the drive element at a distance from the axis thereof.

To provide an idle path, over which the readjustment device does not as yet operate, the mechanism can have a precisely set backlash.

BRIEF DESCRIPTION OF THE DRAWINGS

Illustrative embodiments of the invention are described below by means of the drawings, and further advantages are indicated. In the drawings.

DESCRIPTION OF PREFERRED EMBODIMENTS

Figure 1:
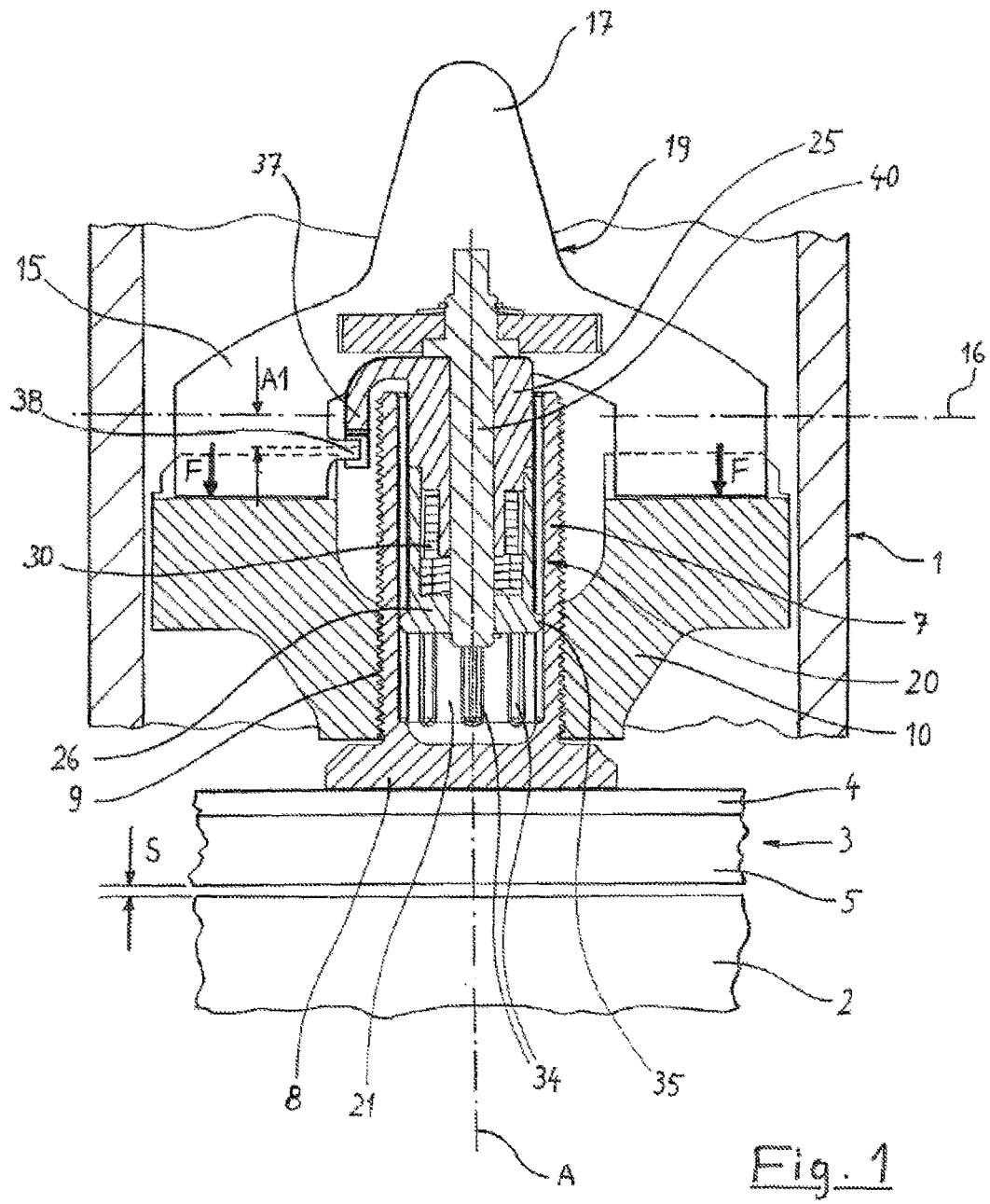
FIG. 1 shows a longitudinal section along the brake-application axis through a vehicle disk brake provided with a readjustment device.
Figure 2:
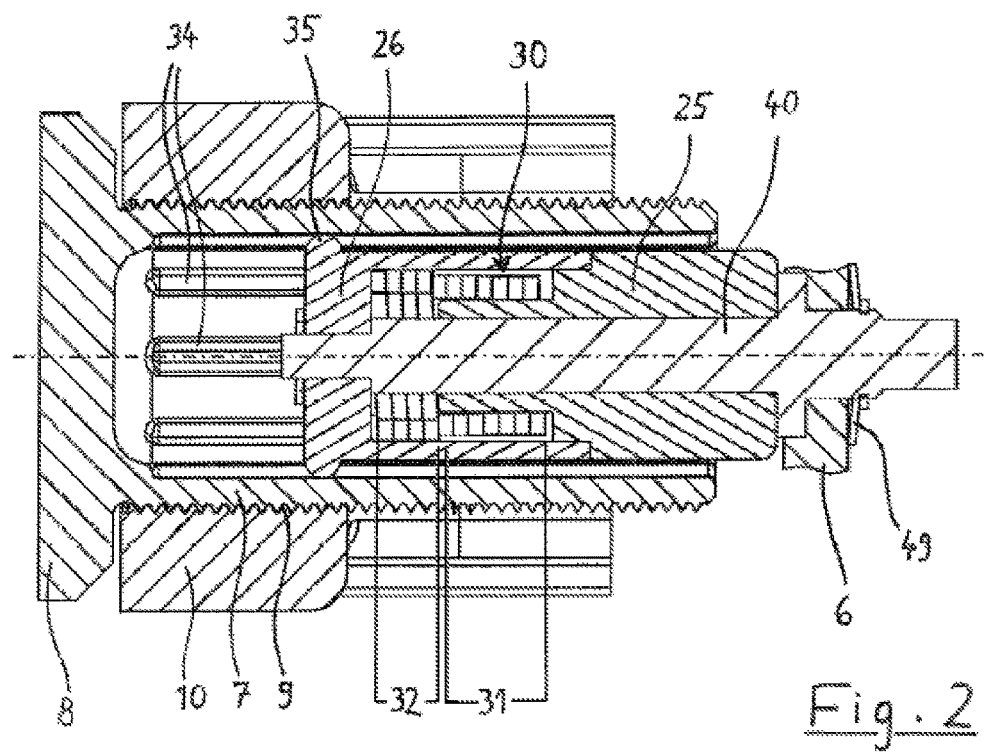
FIG. 2 shows a longitudinal section, rotated through 90° relative to FIG. 1, wherein not all the parts are illustrated.

FIGS. 1 and 2 show individual parts of a disk brake in various longitudinal sections, said brake having an integrated device for the readjustment of the wear-induced release clearance of the brake. A device of this kind is used especially in a sliding caliper disk brake for commercial vehicles to compensate the brake lining wear associated with driving operation.

Together with other individual parts of the vehicle brake, the readjustment device is arranged in a brake housing 1, which is a component part of a brake caliper 6 (FIG. 2) of the sliding caliper disk brake, for example. Another component part of the disk brake is the brake disk 2 (illustrated only in part in FIG. 1), which is connected to the vehicle wheel and against which respective lerake pads 3 operate on each of its two sides. The brake pad 3 consists in the conventional manner of a pad backplate 4 and the actual friction pad 5.

The brake pad 3 is subjected to brake pressure by a pressure ram 7, which can be moved against the brake pad and the foot 8 of which rests against the pad backplate 4. The pressure ram 7 is part of a threaded joint 9 with a pressure piece 10 arranged in a longitudinally movable manner in the brake housing 1, said joint being suitable for transmitting the full braking forces.

A pivoted lever 15 of a pressure-intensifying lever arrangement is supported on the pressure piece 10, on the side facing away from the brake disk 2. For this purpose, the pivoted lever 15 is pivotably mounted on a pivoting axis 16 in the brake housing 1, and it is provided with an extended lever arm 17 on the side facing away from the pressure piece 10. A force element of the vehicle brake operates against this lever arm. In the case of an air-operated disk brake, this force element is a pneumatic cylinder, preferably a diaphragm cylinder. The force produced by the force element is converted by the lever arm 17 into pivoting of the pivoted lever 15 about the pivoting axis 16 thereof, resulting in an advance movement of the pressure piece 10 owing to the lever ratios. If there are no losses in the brake, this corresponds to the application force or braking force F. The arrangement comprising the force element and the lever arrangement jointly forms the brake-application device 19 of the vehicle brake.

For pressure intensification, the pivoted lever 15 is shaped as an eccentric on the side facing the pressure piece 10, the eccentric surface of said eccentric being supported against, a trough-shaped mating surface on the pressure piece 10. The pivoted lever 15 is preferably embodied in a fork shape, as shown in FIG. 1. With this construction, the actuating force and hence the braking force F is transmitted equally and on both sides of the central axis A to the pressure piece 10.

In the unbraked position, the brake in each case has a clearance between the brake disk 2 and the brake pads 3 to ensure that the parts do not rub against one another. This clearance is referred to as the release clearance S. To compensate the enlargement of the release clearance S caused by wear on the two brake pads 3, the vehicle brake is provided with a readjustment device 20, which, in the embodiment according to FIG. 1 and FIG. 2, is largely integrated into the pressure ram 7, which is provided for this purpose with a large location opening 21 on the side facing away from the brake disk but is dosed on the side facing the brake disk 2.

Among the component parts of the readjustment device 20 are a drive element 25, which is mounted on the axis A and can be rotated by the action of the pivoted lever 15, a readjustment element 26, which is rotatably mounted on the same axis A, and a transmission device in the path of motion between the drive element 25 and the readjustment element 26. A wrap spring 30 is used as a transmission device, by means of which the readjustment element 26 is successively rotated in rotary motions in the same direction. It is likewise arranged on the axis A.

The readjustment element 26 is fixed in terms of rotation relative to the pressure ram 7 but can be moved axially relative thereto. For this purpose, as the embodiment according to FIG. 1 and FIG. 2 shows, the pressure ram 7 can be provided on its inside with longitudinal grooves 34, in which projections or noses 35 formed on the outside of the readjustment element 26 are guided in a longitudinally movable manner. Nonrotating longitudinal guidance of the readjustment element 26 relative to the pressure ram 7 is achieved. A pivoting movement during the brake-application process of the pressure ram 7 relative to the readjustment element 26 is also compensated by the noses 35.

The drive element 25 is arranged at a fixed location in the brake housing 1 in the longitudinal direction of the axis A and is provided with a radial arm 37, which can be coupled to a peg 38 arranged on the pivoted lever 15. The peg 38 is at a distance A1 from the pivoting axis 16.

The radial arm 37 and the peg 38 together form a drive mechanism by means of which the drive element 25 can be driven by the pivoted lever 15, even though the pivoted lever 15 is mounted on a pivoting axis 16 which is transverse to the axis of rotation A of the drive element 25. Within the context of this drive mechanism, the peg 38 thus forms a first follower 38 and the radial arm 37 forms a second follower 37. By virtue of this design of the drive mechanism, the pivoting of the pivoted lever 15 about the pivoting axis 16 leads to a rotation of the drive element 25 about the axis A of readjustment. The drive mechanism 38, 37 operates with backlash. Within the range of this backlash, there is no driving action and hence no actuation of the drive element 25 since the release clearance is correct.

For a design which is axial overall, both the drive element 25 and the readjustment element 26 are seated on a rod 40 arranged on the axis A. The rod 40 is axially immovable but capable of rotary motion (in a manner not illustrated specifically) relative to the brake housing 1 and/or the brake caliper 6. The readjustment element 26 is preferably connected for conjoint rotation to the central rod 40. In this case, the drive element 25 is mounted for rotary motion on the rod 40.

By means of the central rod 40, the readjustment device 20 can be returned fully to its initial position, which is normally what happens when worn brake pads are replaced with new brake pads.

The wrap spring 30 used for torque transmission between the drive element 25 and the readjustment element 26 combines and unites in itself the function of a one-way clutch and the function of an overload clutch. Unlike known readjustment devices, no separate components are therefore required to implement these two functions.

The wrap spring 30 shown in FIGS. 1 and 2, which consists of a single continuous coil, is of stepped configuration and consists of two longitudinal sections, each of them cylindrical. In this case, the spring windings have a smaller diameter in the first coil section 31, arranged on the right in FIG. 2, and have the radial support against the drive element 25 on their inside, while the spring windings in the second coil section 32, arranged on the left in FIG. 2, have a somewhat larger diameter in comparison and have the radial support against the readjustment element 26 on their outside. The thickness of the spring windings is preferably constant over the entire length of the coil, particularly for reasons connected with production.

If the two ends of the wrap spring 30 are twisted in opposite directions, there is, in the one case, a slight reduction in the diameter of the wrap spring and, in the other case, i.e. the opposite direction of rotation, a slight enlargement in the diameter of the wrap spring. These technical circumstances are known and use is made of them in the prior art when using wrap springs as one-way clutches or overload clutches. In this arrangement, the wrap spring 30 is supported radially against the drive element 25 along one coil section 31 and is supported radially against the readjustment element 26 along another coil section 32. However, the special feature consists in that one radial support is provided or situated exclusively on the inside and the other radial support is provided or situated exclusively on the outside of the wrap spring 30.

The technical details of the wrap spring 30 and the interaction thereof with the drive element 25, on the one hand, and the readjustment element 26, on the other hand, are now described with reference to the additional FIGS. 3a, 3b, 4a and 4b.

The inside of coil section 31 forms a radial support R1 against a cylindrical outside 44 of the drive element 25. Here, the outside 44 is a shaft journal or shaft section formed on the drive element 25. Conversely, the outside of the other coil section 32 forms a radial support R2 against a cylindrical inside 46 of the readjustment element 26. Here, this inside 46 is a bore in the readjustment element 26.

Figure 3A:
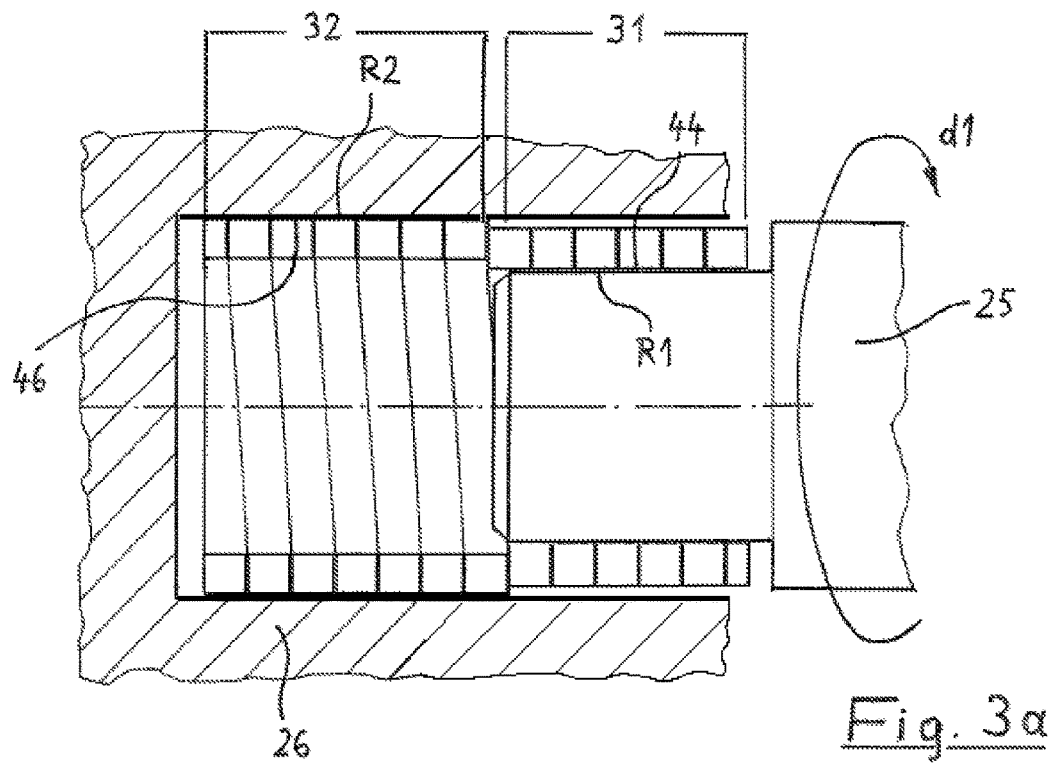
FIGS. 3a, 3b show a section through the wrap spring arranged between a drive element and a readjustment element, in a first situation (FIG. 3a) and in a second situation (FIG. 3b)
Figure 3B:
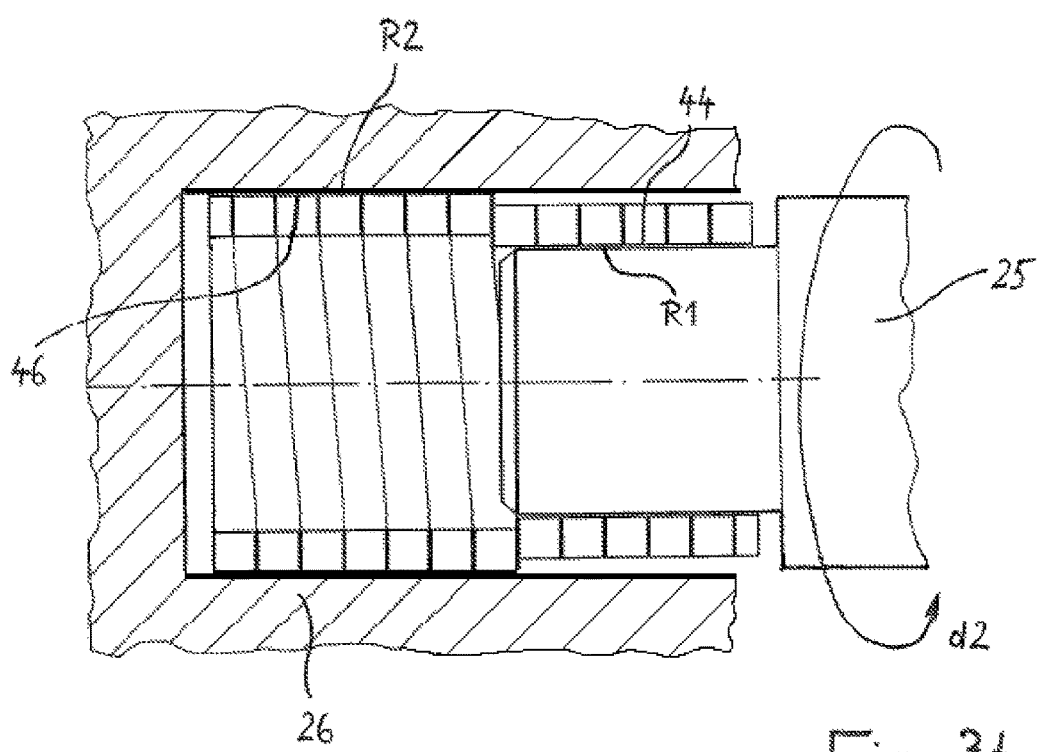

FIG. 3a represents the situation at the beginning of application of the brake, that is to say before the enlarged release clearance S (FIG. 1) has been overcome. The drive element 25 is set in rotation once the release clearance has been overcome. After the normal release clearance has been traversed, the drive element is set in rotation by the pivoted lever 15 in direction of rotation d1 and takes the wrap spring 30 along via the first coil section 31. This spring transmits the torque via the second coil section 32 to the readjustment element 26. On the other side of the wrap spring, i.e. in section 32, there is additionally torque transmission. In this situation, the maximum torque that can be transmitted is no greater than the freewheeling torque, which in this case is the overload torque. A readjustment takes place and the brake wear which has occurred in the intervening period is compensated.

The wrap spring 30 continues to transmit the torque to the readjustment element 26 only until the brake pad 3 rests against the brake disk 2.

However, as soon as the total release clearance S (FIG. 1) is zero, i.e. the pressure ram 7 has come to rest via the brake pad 3 against the brake disk 2, the readjustment element 26 can no longer be rotated because of the sharp rise in friction in the thread 9, as a result of which there is an expansion of the coil and the freewheeling torque at the first coil section 31 is overcome. This expansion, in turn, leads to slipping in the first coil section 31, thereby achieving the effect of an overload clutch.

When releasing the brake, the pivoted lever 15 rotates the drive element 25 in the opposite direction of rotation d2. A friction torque builds up at coil section 31, i.e. the wrap spring 30 contracts somewhat radially. This contraction leads to freewheeling in the other coil section 32. The freewheeling torque generated is designed to be so low that it is not capable of rotating the readjustment element 26. For this, it is a prerequisite that the inhibiting torque on the readjustment element 26 is higher than the freewheeling torque. Here, the inhibiting torque on the readjustment element 26 is produced by a diaphragm spring 49, which acts against a fastening in the brake caliper 6 and against the central rod 40. Owing to the positive engagement between the rod 40 and the readjustment element 26, the inhibiting torque is transmitted. Reversal of the wear compensation already achieved is prevented.

Figure 4A:
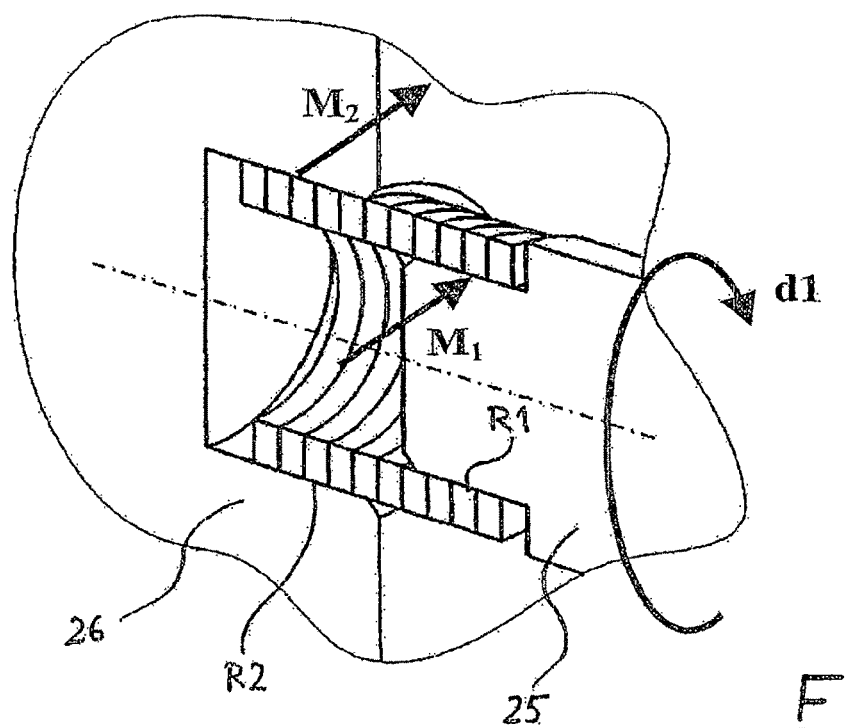
FIGS. 4a, 4b show a perspective section through the wrap spring arranged between the drive element and the readjustment element, in the first situation (FIG. 4a) and in the second situation (FIG. 4b)
Figure 4B:
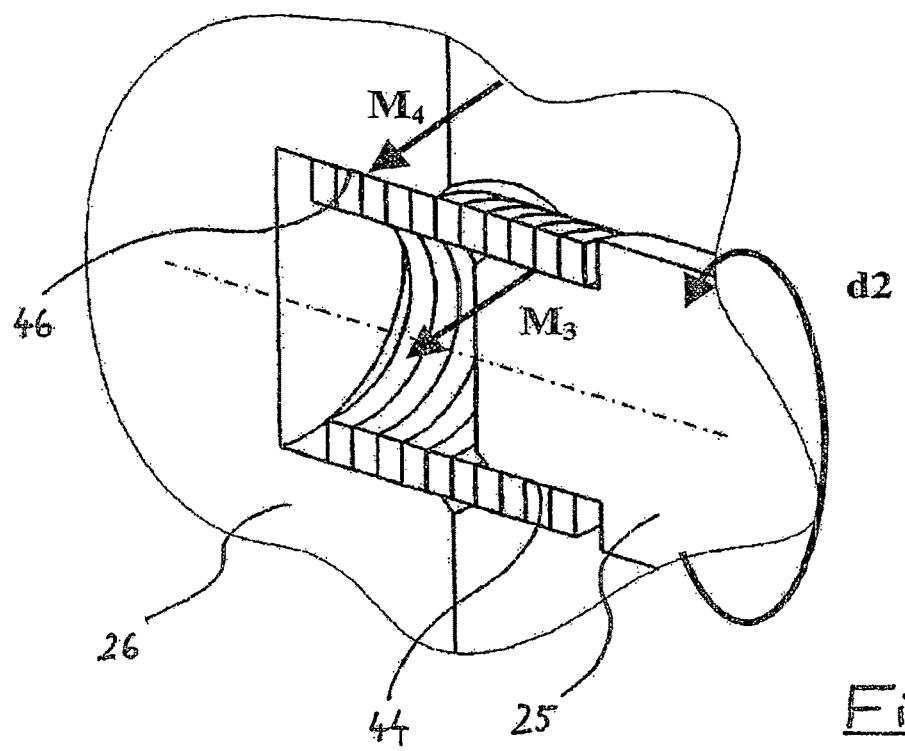

The two situations are also illustrated once again in FIGS. 4a and 4b. In the first direction of rotation, i.e. in the case of brake application or readjustment, $M_1$ is the freewheeling torque and $M_2$ is the locking torque established by expansion at R2. In this case, $M_2$ is higher than $M_1$.

During the return stroke in accordance with FIG. 4b, the locking torque $M_3$ is significantly higher than the freewheeling torque $M_4$. The coil contracts somewhat at R2.

To replace old brake pads 3 with new brake pads 3, the readjustment means must be moved manually into its initial position. For this purpose, the central rod 40 and the readjustment element 26 connected thereto are rotated in direction of rotation d2. The rotary motion is not transmitted to the drive element 25 since coil section 32 decreases in size at the radial support R2 and slips in the readjustment element 26 (freewheeling).

Figure 5:
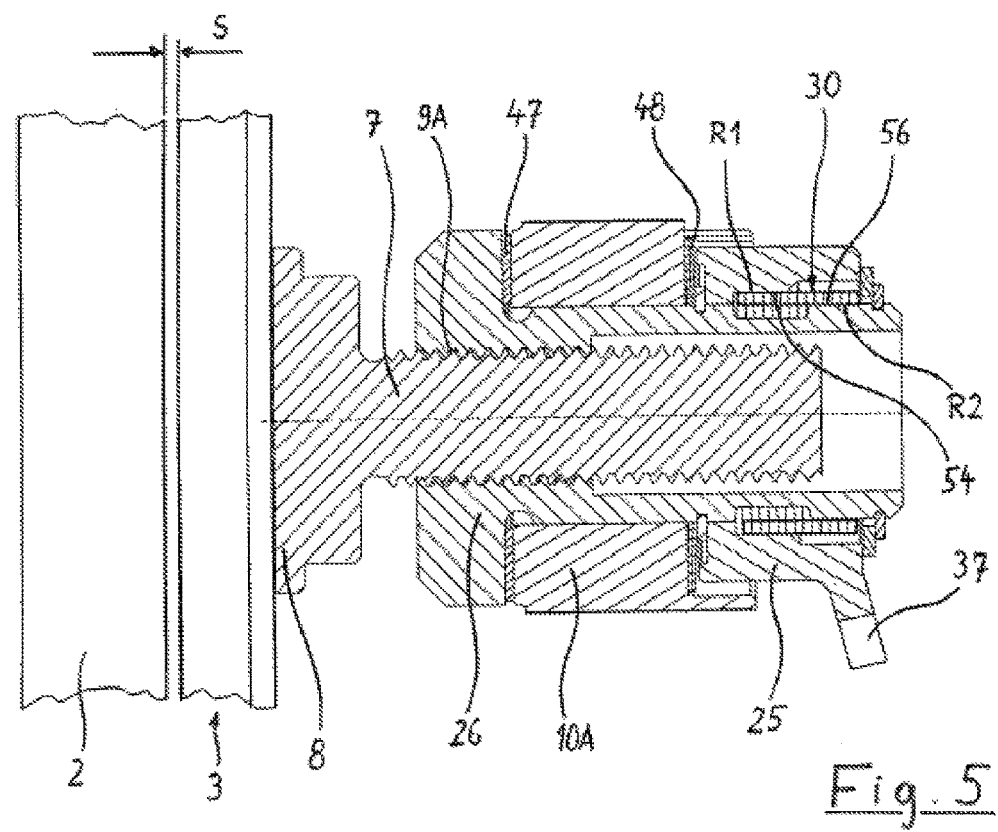
FIG. 5 likewise shows a longitudinal section along the brake-application axis for a second embodiment of a disk brake.

In the second embodiment according to FIG. 5, components that have the same action are provided with the same reference signs as those in the first embodiment according to FIGS. 1 and 2. The first difference with respect to the first embodiment is that the wrap spring 30 is supported on the inside against the readjustment element 26 and on the outside against the drive element 25. To ensure contact with the two radial supports R1, R2 of the wrap spring 30, the readjustment element 26 has a cylindrical shaft section 56, and the drive element 25 has a cylindrical bore 54.

Another difference with respect to the first embodiment is that the pressure ram 7, which is guided non-rotatably in the brake housing in this case, is directly in a threaded joint 9A with the readjustment element 26, which is provided with an internal thread for this purpose. To absorb the brake-application forces, the readjustment element 26 is supported against the pressure piece 10A via an axial bearing 47. As in the first embodiment, the pivoted lever of the brake-application device (not shown specifically here) is supported on the pressure piece 10A.

In FIG. 5, the wrap spring 30 is furthermore without a step, i.e. it has a constant internal and external radius over its entire length.

The drive element 25, which is provided with a radial arm as a follower 37 in this case, as in FIG. 1, is supported against the pressure piece 10A from the other side via diaphragm springs 48.

LIST OF REFERENCE SIGNS 1 brake housing
2 brake disk
3 brake pad
4 pad bacicplate
5 friction pad
6 brake caliper
7 pressure ram
8 foot
9 threaded joint
9A threaded joint
10 pressure piece
10A pressure piece
15 pivoted lever
16 pivoting axis
17 lever arm
19 brake-application device
20 readjustment device
21 location opening
25 drive element
26 readjustment element
30 wrap spring, transmission device
31 first coil section
32 second coil section
34 longitudinal groove
35 projection
37 radial arm, second follower
38 peg, first follower
40 central rod
41 drive pinion
44 outside
46 inside
47 axial bearing
48 diaphragm spring
49 diaphragm spring
54 bore
56 shaft section
A axis of the readjustment device
A1 axis
d1 direction of rotation
d2 direction of rotation
F braking force
$M_1$ freewheeling torque
$M_2$ locking torque
$M_3$ locking torque
$M_4$ freewheeling torque
R1 radial support
R2 radial support
S release clearance

What is claimed is:

1. A vehicle brake comprising:
   a brake-application device comprising a force element and providing a braking force;
   a pressure-intensifying lever arrangement;
   a readjustment device configured to readjust a wear-induced release clearance of the vehicle brake;
   the readjustment device comprising:
   a rotatably arranged drive element operatively connected to the brake-application device to be actuated by the brake-application device to rotate about an axis of rotation;
   a readjustment element arranged rotatably on the axis of rotation; and
   a transmission device arranged in a movement path between the drive element and the readjustment element;
   wherein the transmission device is a helical wrap spring comprising a first axial coil section and a second axial coil section, wherein the first axial coil section is supported exclusively and directly at the drive element and is not supported at the readjustment element, and wherein the second axial coil section is supported exclusively and directly at the readjustment element and is not supported at the drive element;
   wherein the drive element is arranged:
   radially inside the first axial coil section and the readjustment element is arranged radially outside the second axial coil section so that the first axial coil section is radially supported exclusively on an inside of the wrap spring and the second axial coil section is radially supported exclusively on an outside of the wrap spring; or
   radially outside the first axial coil section and the readjustment element is arranged radially inside the second axial coil section so that the first axial coil section is radially supported exclusively on an outside of the wrap spring and the second axial coil section is radially supported exclusively on an inside of the wrap spring.

2. The vehicle brake as claimed in claim 1, wherein the first coil section comprises a plurality of first coil turns and wherein the second coil section comprises a plurality of second coil turns.

3. The vehicle brake as claimed in claim 2, wherein the first coil section comprises at least three of the first coil turns and wherein the second coil section comprises at least three of the second coil turns.

4. The vehicle brake as claimed in claim 1, wherein the wrap spring is cylindrical and has a constant internal radius and a constant external radius across an entire length of the wrap spring in an unstressed state of the wrap spring.

5. The vehicle brake as claimed in claim 1, wherein the wrap spring has a stepped configuration across a length thereof in an unstressed state of the wrap spring, wherein the stepped configuration is comprised of a first cylindrical longitudinal section forming the first axial coil section and a second cylindrical longitudinal section forming the second axial coil section, wherein the first and second cylindrical sections are formed integrally with each other, wherein the first cylindrical longitudinal section has first spring windings of a first diameter and the second cylindrical longitudinal section has second spring windings of a second diameter, wherein the first and second diameters are different form each other.

6. The vehicle brake as claimed in claim 5, wherein the first spring windings are supported radially inwardly on the drive element and wherein the second spring windings are supported radially outwardly on the readjustment element wherein the first diameter of the first spring windings is smaller than the second diameter of the second spring windings.

7. The vehicle brake as claimed in claim 1, further comprising a drive mechanism, wherein the lever arrangement comprises a pivoted lever mounted in a brake housing of the vehicle brake, wherein the drive mechanism operatively connects the pivoted lever to the drive element such that pivoting of the pivoted lever causes a rotation of the drive element.

8. The vehicle brake as claimed in claim 7, wherein the drive mechanism comprises a first follower and a second follower designed for mutual engagement, wherein the first follower is arranged on the pivoted lever at a distance from a pivoting axis of the pivoted lever and the second follower is arranged on the drive element at a distance from the axis of rotation of the drive element.

9. The vehicle brake as claimed in claim 7, wherein the drive mechanism has backlash in a direction of rotation so that no actuation of the drive element within a range of the backlash occurs.

10. The vehicle brake as claimed in claim 1, wherein the force element is a pressure medium cylinder.

* * * * *